United States Patent
Nishimura et al.

(10) Patent No.: US 7,508,417 B2
(45) Date of Patent: Mar. 24, 2009

(54) WIRELESS IMAGING APPARATUS AND ITS CONTROL METHOD

(75) Inventors: Naoki Nishimura, Tokyo (JP); Kenji Saitoh, Tochigi (JP); Masaaki Shibata, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1301 days.

(21) Appl. No.: 10/677,623

(22) Filed: Oct. 2, 2003

(65) Prior Publication Data

US 2004/0071460 A1    Apr. 15, 2004

(30) Foreign Application Priority Data

Oct. 8, 2002    (JP)    ............................. 2002-295305
Oct. 9, 2002    (JP)    ............................. 2002-296596

(51) Int. Cl.
*H04N 9/04*    (2006.01)
*H04N 5/225*    (2006.01)
*H04N 5/228*    (2006.01)
*G03B 17/24*    (2006.01)

(52) U.S. Cl. .................... 348/211.1; 396/310; 348/335; 348/364

(58) Field of Classification Search ................ 396/310; 348/14.02, 64, 211.2, 211.1, 335, 364; 386/117; 343/895

See application file for complete search history.

(56) References Cited

U.S. PATENT DOCUMENTS

| 5,004,328 | A |   | 4/1991 | Suzuki et al. |
| 6,052,509 | A | * | 4/2000 | Abe ........................... 386/117 |
| 2002/0047910 | A1 | * | 4/2002 | Tariki ......................... 348/239 |
| 2003/0142032 | A1 | * | 7/2003 | Lichtfuss .................... 343/873 |
| 2005/0185195 | A1 | * | 8/2005 | Seko .......................... 356/614 |
| 2005/0219144 | A1 | * | 10/2005 | Ying .......................... 343/895 |

FOREIGN PATENT DOCUMENTS

JP    A 10-271469    10/1998

OTHER PUBLICATIONS

Nikkei Electronics, Jul. 15, 2002, pp. 99 to 129, with English Translation. (Fumitada Takahashi and Hiroki Hohda).

* cited by examiner

*Primary Examiner*—Tuan V Ho
*Assistant Examiner*—Selam T Gebriel
(74) *Attorney, Agent, or Firm*—Cowan, Liebowitz & Latman, P.C.

(57) ABSTRACT

To realize a wireless imaging apparatus having excellent sensitivity to an environmental change, a wireless imaging device has an imaging unit with a function of imaging a subject and a communication unit with a wireless communication function. The imaging unit has, at least, an optical lens, an aperture 2 to limit incident light from the optical lens, an optical sensor 4 to convert the incident light passed through the aperture 2 into an electric signal, and an antenna for wireless communication, integrally formed with the aperture.

12 Claims, 23 Drawing Sheets

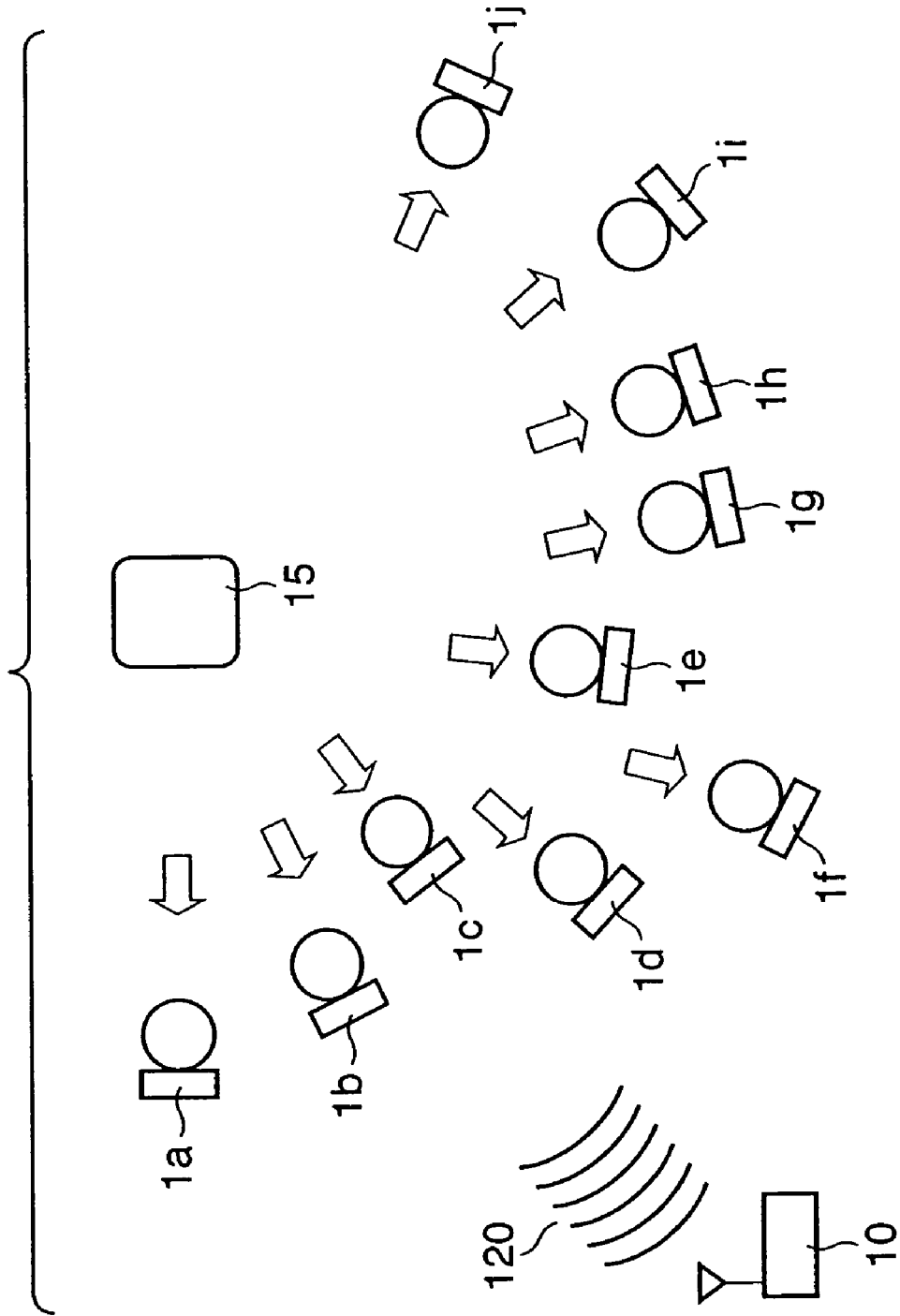

WIRELESS IMAGING APPARATUS AND ITS CONTROL METHOD

FIELD OF THE INVENTION

The present invention relates to a wireless imaging apparatus and its control method.

BACKGROUND OF THE INVENTION

In recent years, wireless communication using radio frequency (RF) and light is widely performed. For example, a cellular phone using a magnetic wave in a 900 to 1900 MHz band is indispensable as an anytime-and-anywhere communicable wireless mobile communication tool. Further, as communication means between personal computers or between a personal computer and a printer, wireless communication using a radio wave in a 2.45 GHz band in conformity with wireless LAN (IEEE 802.11b or IEEE 802.11a) or Bluetooth standard, is realized and widely used in offices and houses. Further, a Suica (registered trademark) card, adopted by East Japan Railway Company in 2001, realizes non-contact reading and writing of ticket at a station ticket gate.

The above tools are about palm-sized products, however, coin-sized or smaller wireless communication tools, so-called radio tags are used for personal identification (ID) purpose and the like. For example, an anti-theft automobile key is realized by using a small radio tag of about 1 cm embedded in the key thereby enabling an authentication operation upon turning-on of the key. In addition, in a case where cable communication cannot be performed without difficulty between e.g. a mountain top place and a point at the ground, optical communication is employed for high-speed communication of images obtained by a camera.

Further, a value-added network incorporating a large number of sensors has been actively developed. For example, proposed is a system as a precaution against earthquake, constructed with an acceleration sensor and a strain sensor embedded into a steel frame of a building structure for measuring the degree of fatigue of the steel frame or concrete.

Further, recently, a wireless sensing network is positively proposed.

Nikkei Electronics issued Jul. 15, 2002 introduces in pp 99 to 129, several sensing network systems. For example, a large number of sensors are distributed in a forest, and the amount of generated oxygen, the amount of absorbed $CO_2$, the temperature, humidity of the forest and the like are grasped in detail, for the purpose of early detection of bush fire or $CO_2$ emission trading.

Further, an imaging network by optical sensing may be constructed. Among various types of lenses for an imaging system U.S. Pat. No. 5,004,328 discloses a spherical lens 1 including an aperture 2 in its central portion as shown in FIG. 11. It is known that the aperture improves image formation characteristic of the imaging system.

In a case where a wireless sensing network is constructed by arranging a large number of sensing devices (hereinbelow, each referred to as an "Mote"), to sense a slight environmental change in a wide range, the size of the Mote must be small. Further, in wireless communication, to perform communication with a place as far as possible, the size of antenna must be as large as possible.

Accordingly, in a case where a wireless sensing network by wireless communication is constructed for sensing a slight environmental change in a wider range, it is necessary to reduce the size of the Mote and increase the size of the antenna for wireless communication.

However, if the antenna for wireless communication is provided in the Mote, the size of the Mote increases, which disturbs construction of wireless sensing network for excellent sensitivity to environmental change. Further, as the structure of the Mote is complicated, a manufacturing process of the Mote becomes complicated.

Further, upon construction of a sensing network system with distributed devices having sensing and communication functions (hereinbelow, each referred to as a "sensing Mote"), if each sensing Mote has a high performance capability, the cost is increased by arranging a large number of sensing Motes.

Further, in a case where the sensing Mote is reduced in size for sensing a slight environmental change, the sensing function installed in the small sensing Mote is limited.

SUMMARY OF THE INVENTION

The present invention has its object to solve the above-described problems individually or at once, and to simplify the structure of a wireless imaging apparatus without increasing the size of the apparatus.

According to the present invention, the foregoing object is attained by providing a wireless imaging device, comprising: an imaging section, arranged to provide a function of imaging a subject; and a communication section, arranged to provide a wireless communication function, wherein the imaging section comprises an optical lens, an aperture to limit incident light on the optical lens, an optical sensor to convert the incident light passed through the aperture into an electric signal, and an antenna integrally provided with the aperture, to wireless-transmit the electric signal converted into a radio signal by the communication section.

Further, the foregoing object is attained by providing an image obtaining apparatus, comprising a plurality of the above devices, wherein the plurality of devices and the wireless communication construct a network of the plural devices.

Further, another object of the present invention is to simplify to functions of each wireless imaging apparatus and to provide a high-level imaging function by realizing co-operative work by plural wireless imaging apparatuses.

According to the present invention, the foregoing object is attained by providing an image obtaining apparatus, comprising a plurality of imaging devices which provide a wireless communication function and a single imaging function, wherein the plurality of imaging devices provide, as a whole, one or more high-level imaging functions by co-operative work using the wireless communication function.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 23 is a schematic diagram showing an example of an imaging network system according to a ninth embodiment of the present invention.

DETAILED DESCRIPTION OF THE PREFERRED EMBODIMENTS

Preferred embodiments of a wireless imaging apparatus of the present invention will be described in detail in accordance with the accompanying drawings.

First Embodiment

[Structure of Wireless Imaging Device in Wireless Imaging Apparatus]

Figure 1:
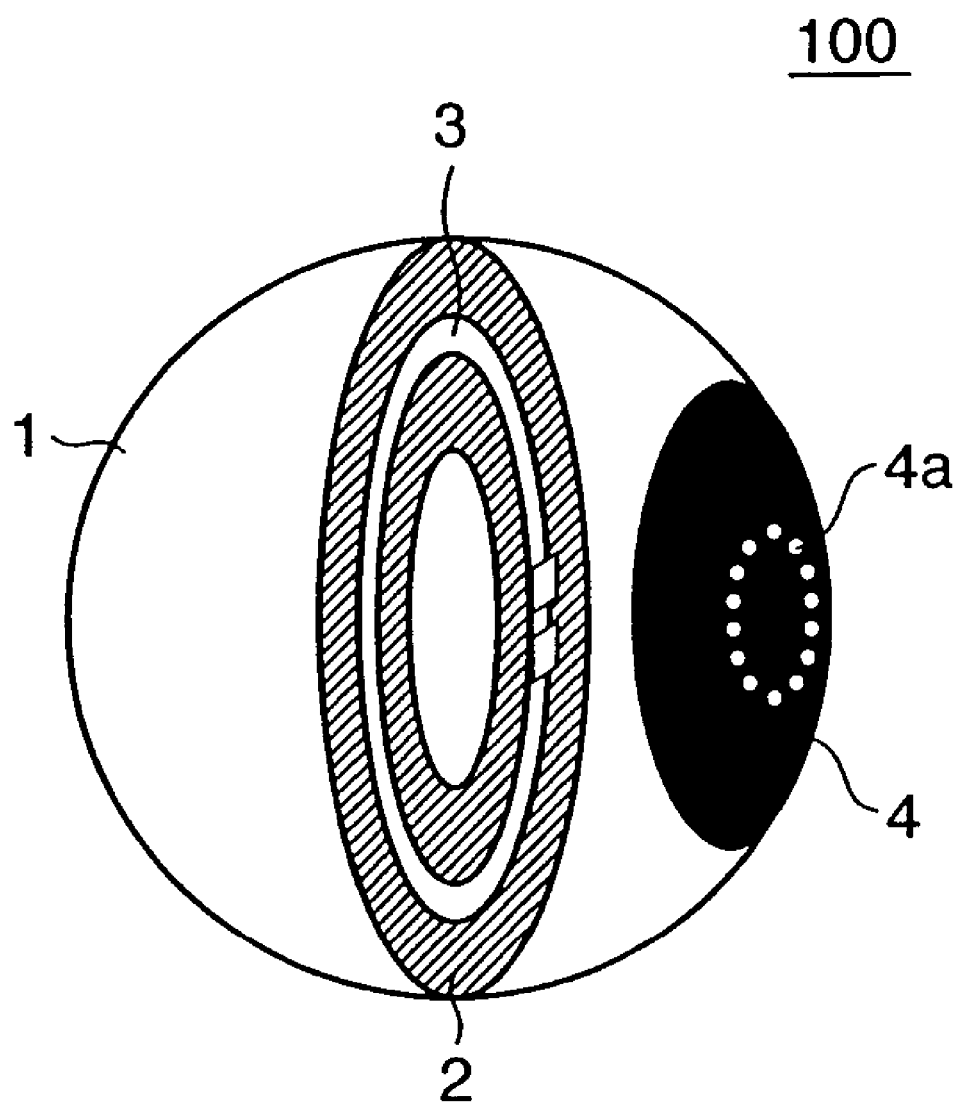
FIGS. 1 and 2 are schematic diagrams showing a wireless imaging device included in a wireless imaging apparatus according to a first embodiment of the present invention.

FIG. 1 is a schematic diagram showing a wireless imaging device (imaging Mote) 100 included in the wireless imaging apparatus according to a first embodiment of the present invention.

The imaging Mote 100 has a spherical lens 1, an aperture 2 provided in a position of overlapped bottom parts of imaginary 2 hemispherical members divided from the center of the spherical lens 1, to limit incident light in the imaging Mote 100, a coil antenna 3 integrally provided with the aperture 2, and an optical sensor 4 to convert the incident light passed through the aperture 2 into an electric signal in a position around a vertical point on the inner side of one hemispherical member. Further, a wireless communication circuit 4a, to generate a high frequency signal from image data converted into the electric signal by the optical sensor 4, is provided on the same substrate of the optical sensor.

The coil antenna 3 has a terminal (not shown) electrically connected to the wireless communication circuit 4a, to transmit the high frequency signal generated by the wireless communication circuit 4a to the outside via the antenna 3.

Figure 2:
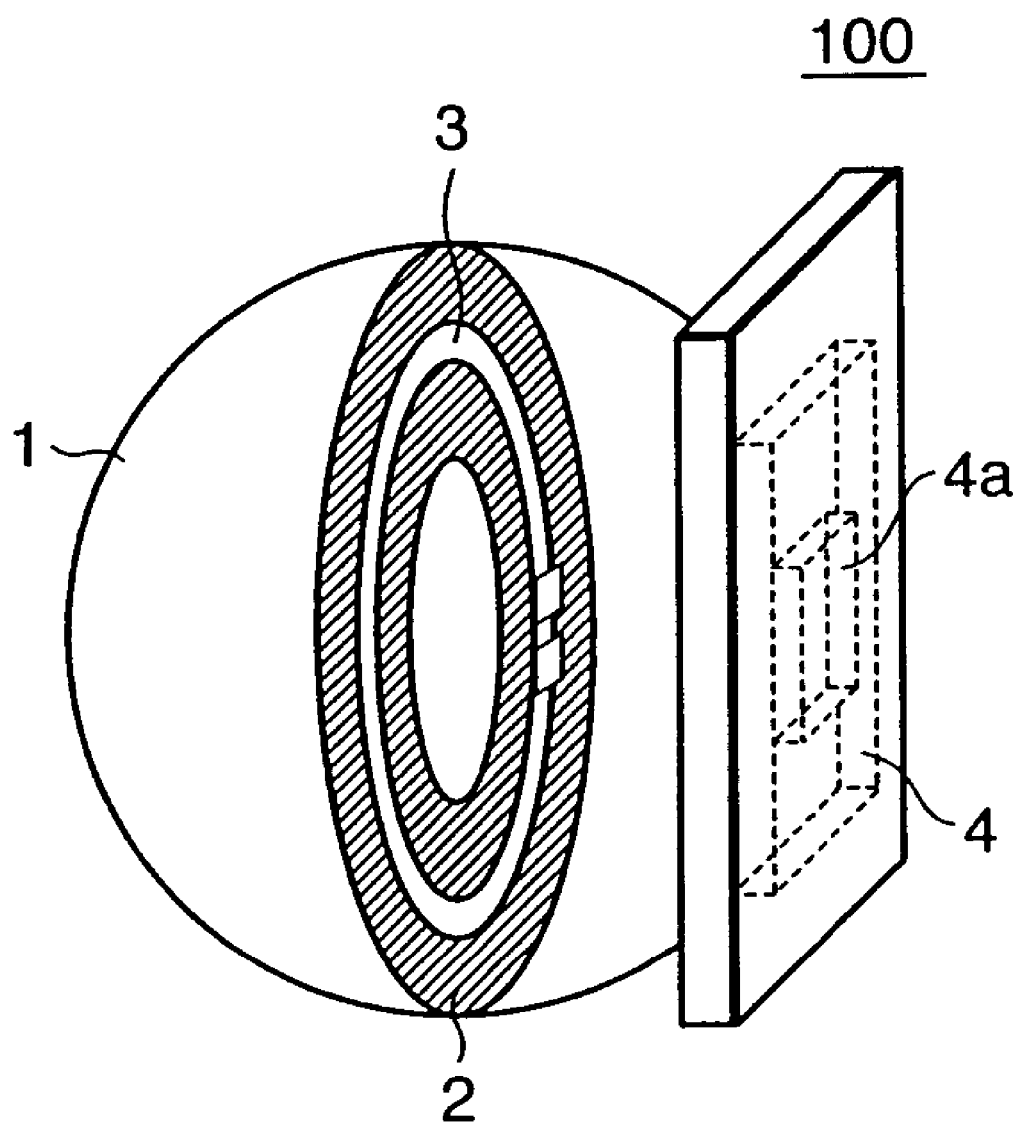

FIG. 2 illustrates a case where the substrate holding the optical sensor 4 and the wireless communication circuit 4a is provided separately from the spherical lens 1. In this case, the aperture 2 has the coil antenna 3. In comparison with FIG. 1, the antenna 3 or a light-emitting device for optical communication can be provided on the rear side of the substrate in FIG. 2. Note that when the imaging Mote 100 is constructed, it is preferable that the optical sensor 4 is provided on the inner spherical surface of the spherical lens 1 as shown in FIG. 1.

Figure 3:
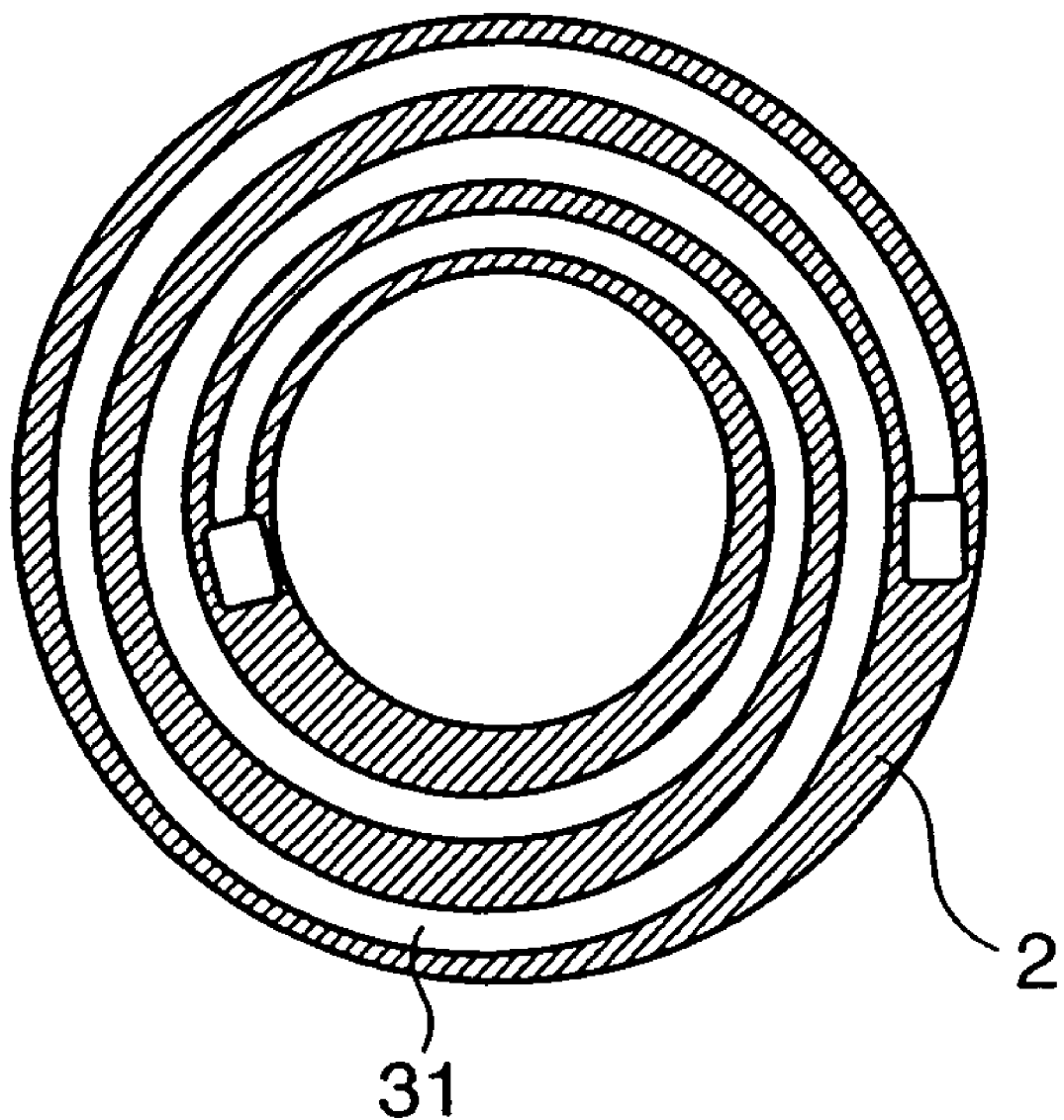
FIGS. 3 to 5 are schematic diagrams showing an aperture of the wireless imaging device.
Figure 4:
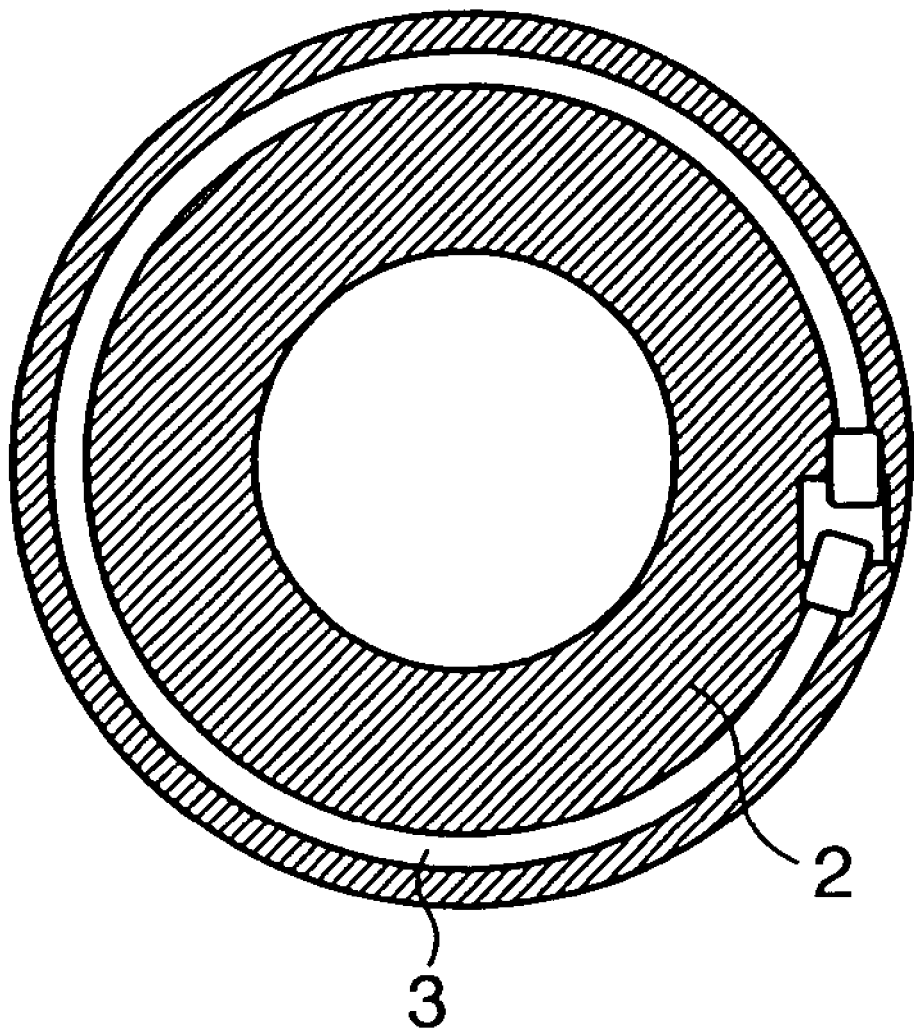
Figure 5:
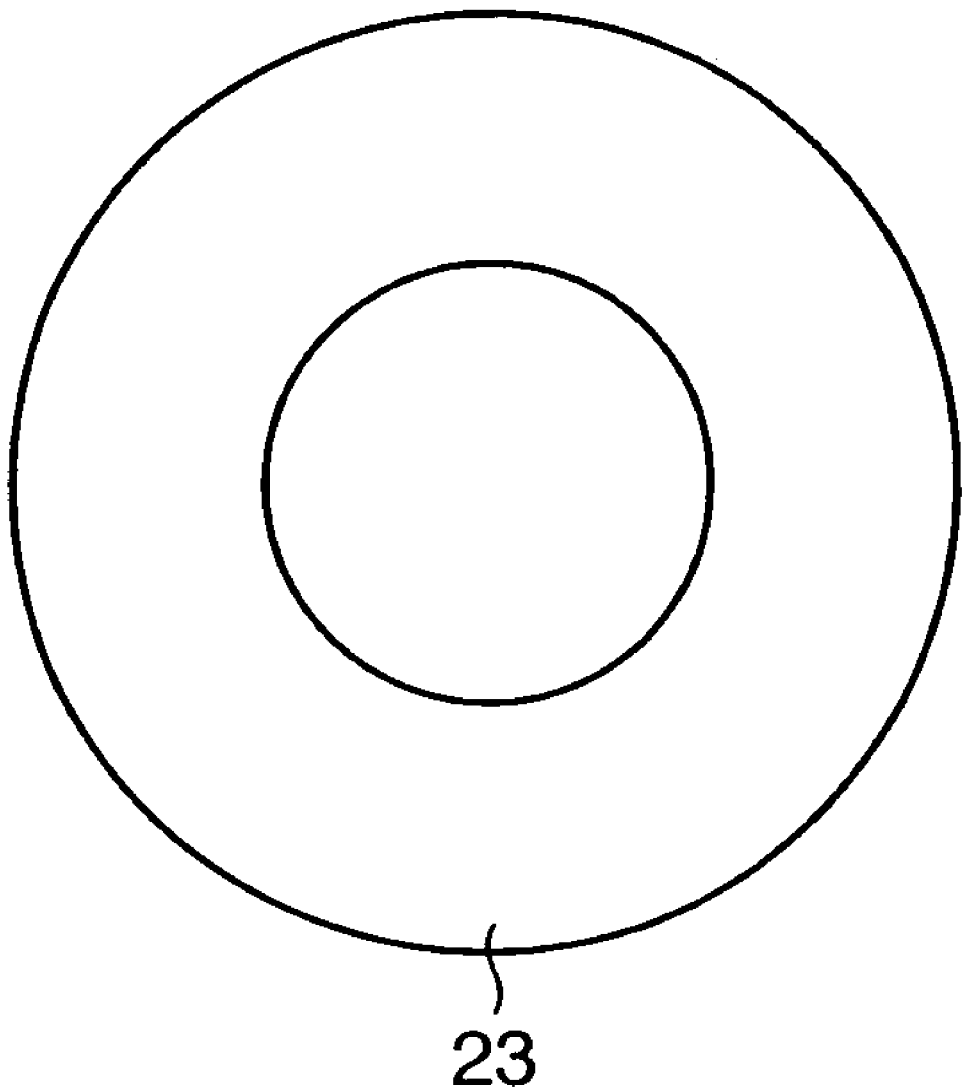

FIGS. 3 to 5 show other examples of the antenna 3 in FIGS. 1 and 2.

FIG. 3 shows a coil 31 of the antenna 3, having an about 3 turns, for higher communication performance.

FIG. 4 shows the antenna 3 having approximately the same structure as that in FIG. 1. The coil of the antenna 3, having the same 1 turn, is arranged on the outer peripheral side of the aperture 2, for improvement in communication performance.

FIG. 5 shows an arrangement where the entire surface of the aperture 2 functions as an antenna 23. In this case, the area of the aperture 2 can be most effectively utilized. However, the antenna 23 must be formed of a high-conductivity material as a high-performance antenna.

In the present invention, if the imaging Mote 100 has a diameter of 1 mm, the maximum diameter of the coil of the antenna 3 is 1 mm.

Further, the present invention includes, in its scope, management of image information by a sensing network system constructed with functional device group of plural imaging Motes 100 to perform imaging functions by co-operative work using wireless communication.

[Manufacturing of Wireless Imaging Device]

Next, a manufacturing method of the imaging Mote 100 according to the present embodiment will be described.

Figure 6:
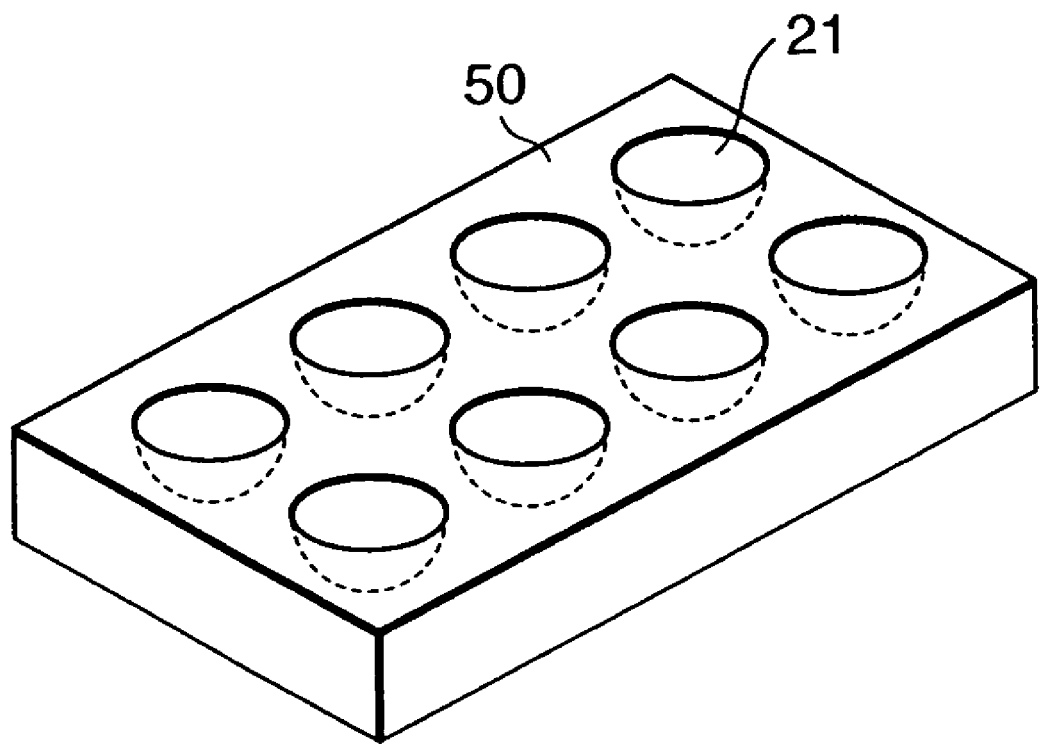
FIGS. 6 and 7 are explanatory views showing a manufacturing method of the wireless imaging device.

FIG. 6 is an explanatory view showing the manufacturing method of the imaging Mote 100 according to the present embodiment. First, hemispherical resin mold lenses 20 are formed by using a metal mold 50 having plural hemispherical cavities 21 as shown in FIG. 6.

Figure 7:
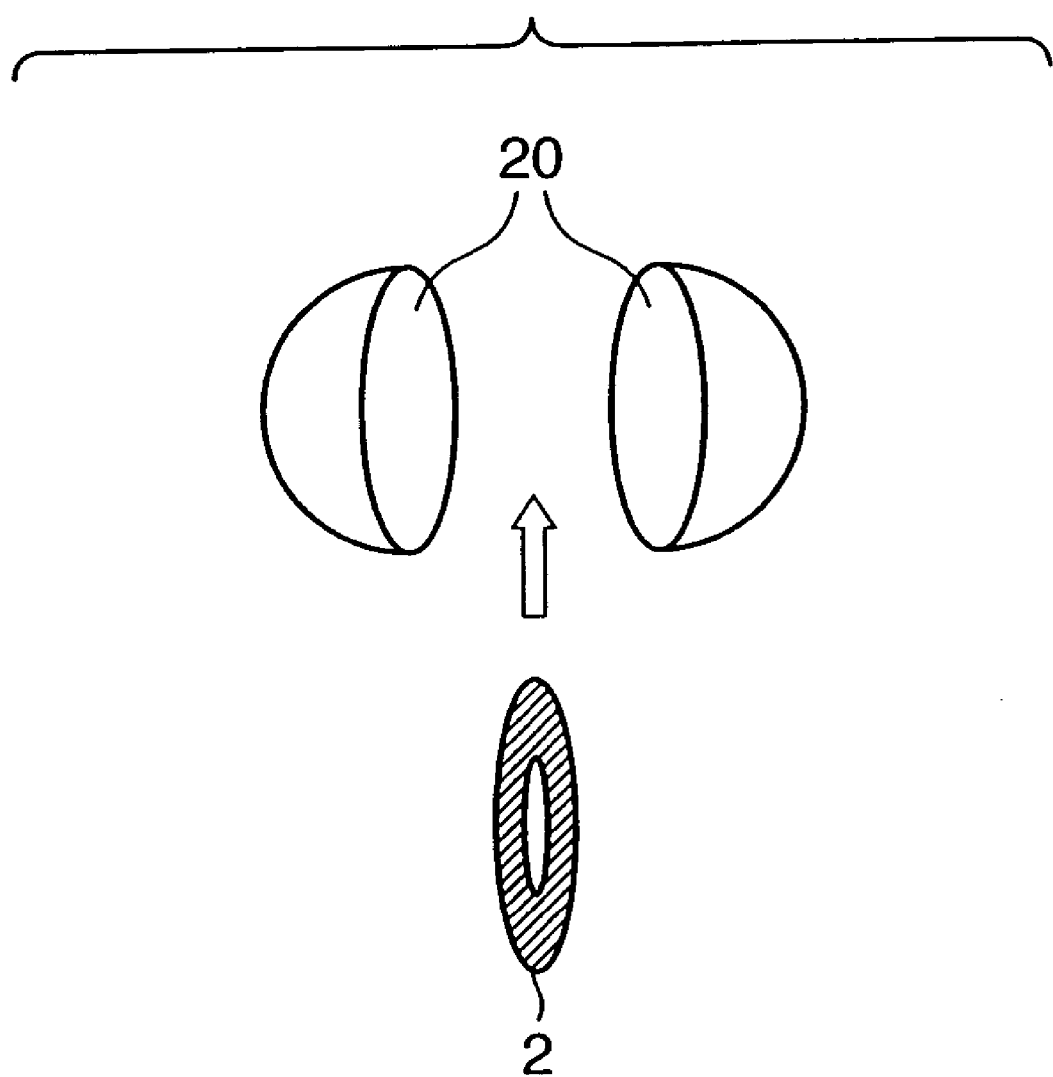
Figure 8:
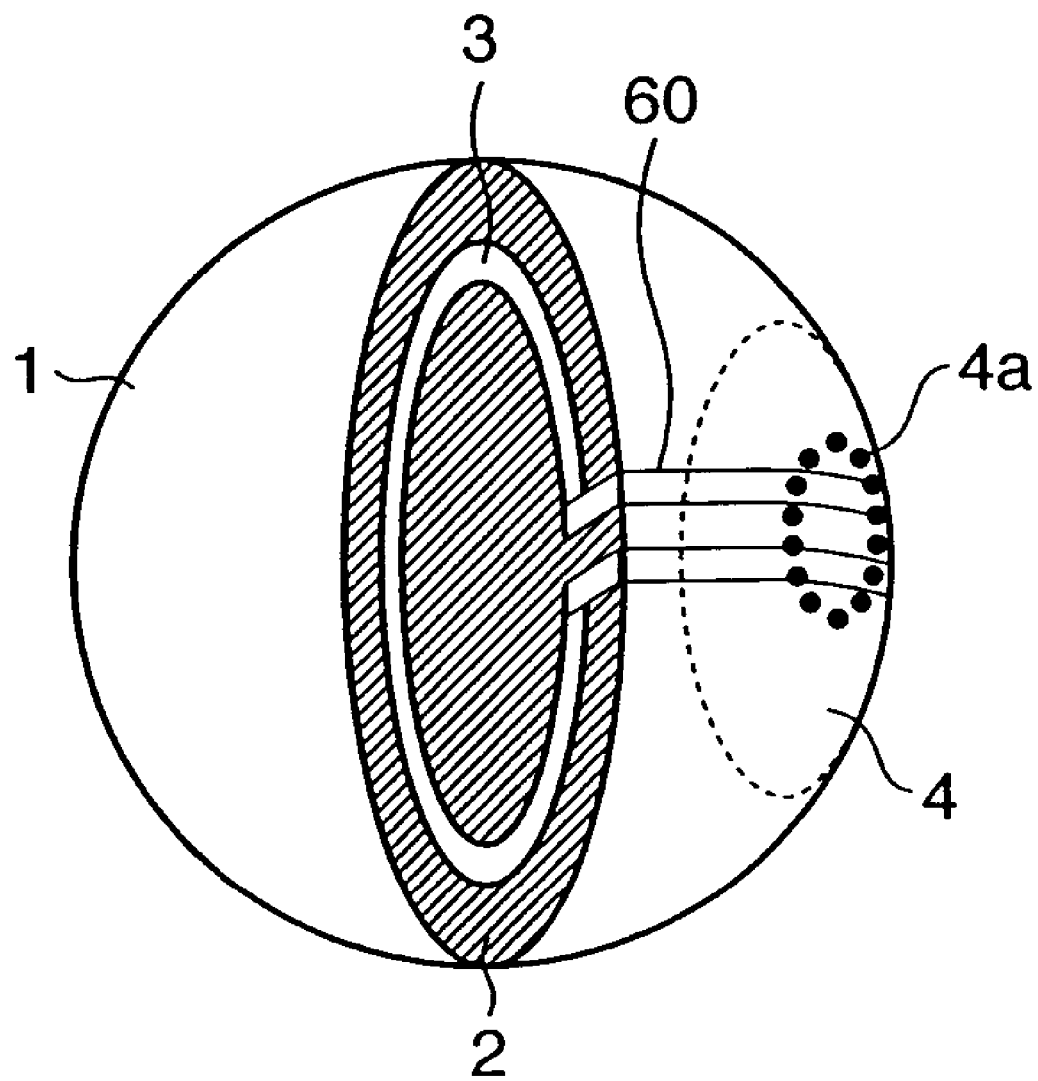
FIG. 8 is a schematic diagram showing the wireless imaging device included in the wireless imaging apparatus.

Next, two of the hemispherical lenses 20 are joined with the aperture 2 therebetween as shown in FIG. 7. At this time, the aperture 2 is already provided with the antenna 3. Upon completion of the joining, the substrate holding the optical sensor 4 and the communication circuit 4a, and the antenna 3 are electrically connected via wires 60.

Through the above process, the imaging Mote 100 of the present embodiment provided with the aperture 2 and the antenna 3 is completed. Further, by the above manufacturing method, a large number of imaging Motes 100 can be formed at once.

Second Embodiment

Figure 9:
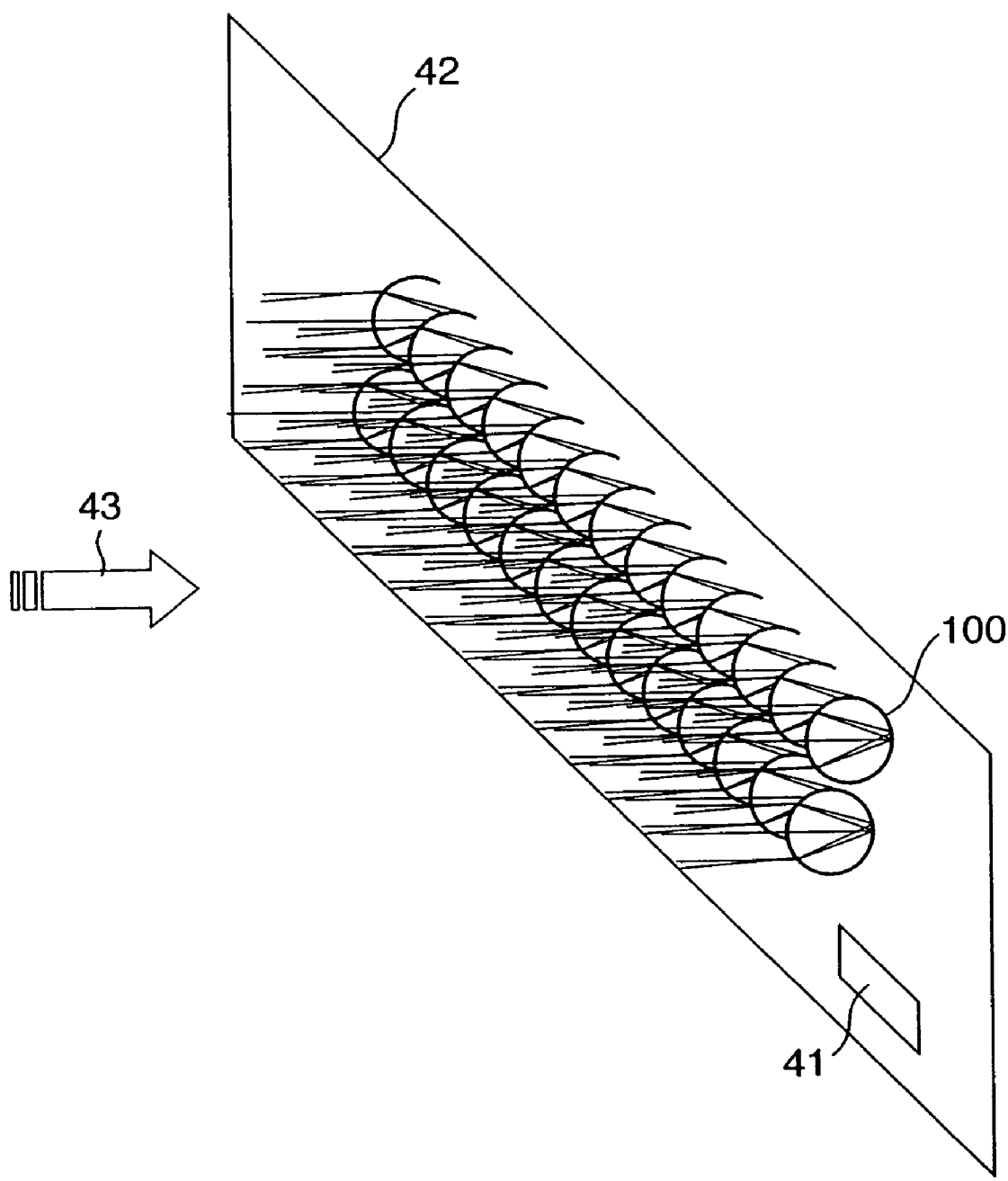
FIGS. 9 and 10 are explanatory views showing the wireless imaging apparatus according to a second embodiment of the present invention.

FIG. 9 is an explanatory view showing the wireless imaging apparatus where plural small spherical imaging Motes 100 are provided on a card substrate 42. The wireless imaging apparatus of the present embodiment has a base 41, to communicate with the plural imaging Motes 100 and control the imaging Motes 100, on the substrate 42.

The wireless imaging apparatus shown in FIG. 9 has the imaging Motes 100 to receive light 43 from a subject, generate sensing image information from the light and transmit the information via the antenna 3 integrally formed with the internal aperture 2 to the outside, and the base 41, provided on the card substrate 42, to receive the sensing image information from the imaging Motes 100. The base 41 performs high image quality processing based on the image information received from the plural imaging Motes 100, and processing for obtaining 3-dimensional image information by calculation of depth information utilizing a parallax error between the small spherical imaging Motes 100.

Figure 10:
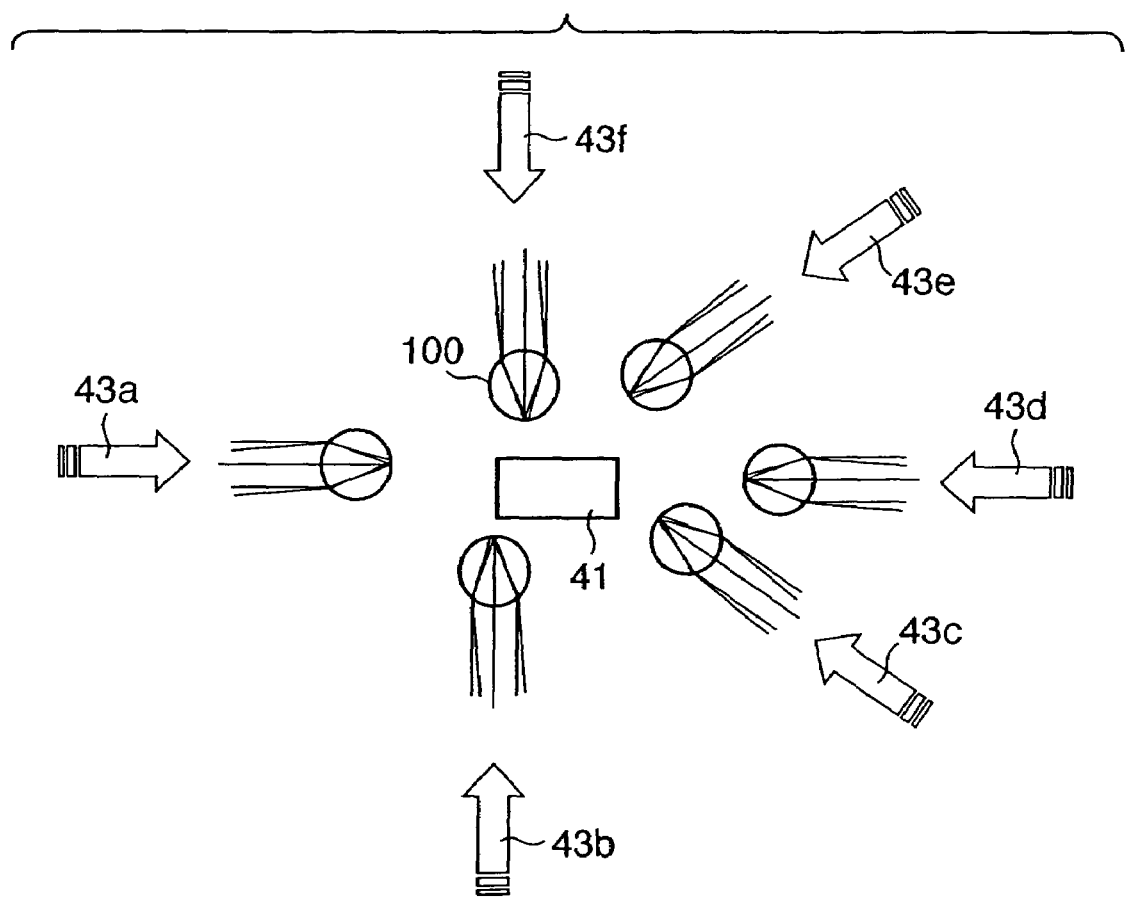
Figure 11:
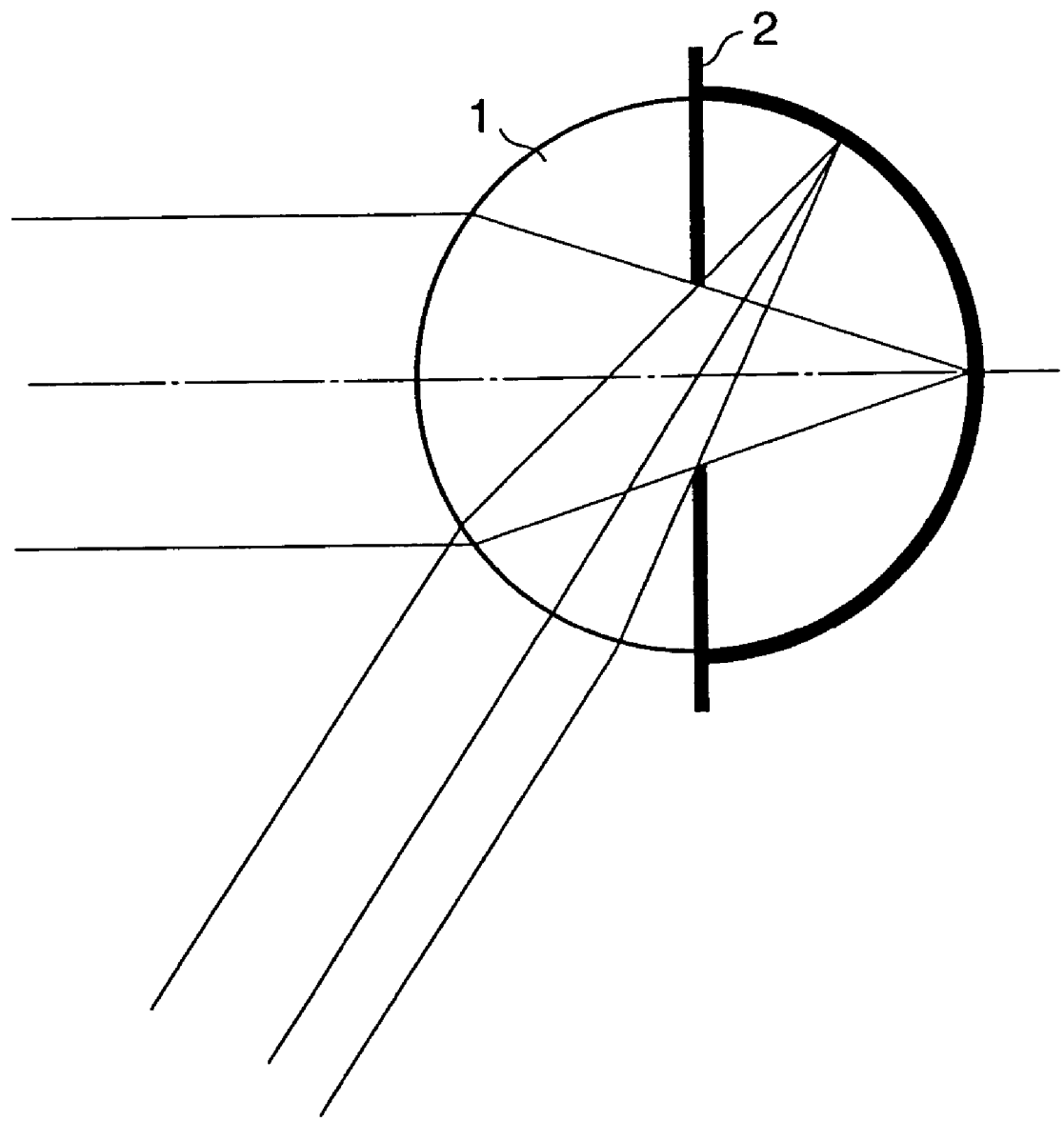
FIG. 11 is a schematic diagram showing a spherical lens.

FIG. 10 is an explanatory view showing another example of the wireless imaging apparatus where the plural small spherical imaging Motes 100 are provided along various directional optical axes so as to obtain a wide angle of image information. As in the case of the wireless imaging apparatus in FIG. 9, the wireless imaging apparatus in FIG. 10 has the imaging Motes 100 to receive light 43a to 43f from the respective directions, generate sensing image information from the light and transmit the information via the antenna 3 integrally formed with the internal aperture 2 to the outside, and the base 41 to receive the sensing image information from the imaging Motes 100, combining the information from the respective directions and generate wide-angle image information.

Although not shown, the base 41 has a function of transmitting a control signal to turn on/off a transmission operation of sensing image information of the wireless communication circuit 4a of each imaging Mote 100. The base can sequentially obtain image information by scanning the plural imaging Motes 100 by on-controlling the transmission operations in desired imaging Motes 100. Otherwise, it may be arranged such that the base 41 has a control function of on/off controlling power supply to the wireless communication circuit 4a of each imaging Mote 100, and sequentially obtains the image information by scanning the plural imaging Motes 100 by on-controlling the power supply to the wireless communication circuits 4a of desired imaging Motes 100. Otherwise, it may be arranged such that frequencies of radio signals emitted from the plural imaging Motes 100 are different, and image information is sequentially obtained from the plural imaging Motes 100 by scanning reception frequencies by the base 41.

According to the above-described embodiment, as the antenna 3 for wireless communication is integrally formed with the aperture 2, a predetermined size of the antenna 3 can be ensured without increasing the wireless imaging device in size, and a wireless imaging apparatus having excellent sensing sensitivity to an environmental change can be realized. In comparison with the case where the antenna is provided separately from the aperture 2, the structure of the imaging device can be simplified and the manufacturing process can be facilitated.

Third Embodiment

Figure 12:
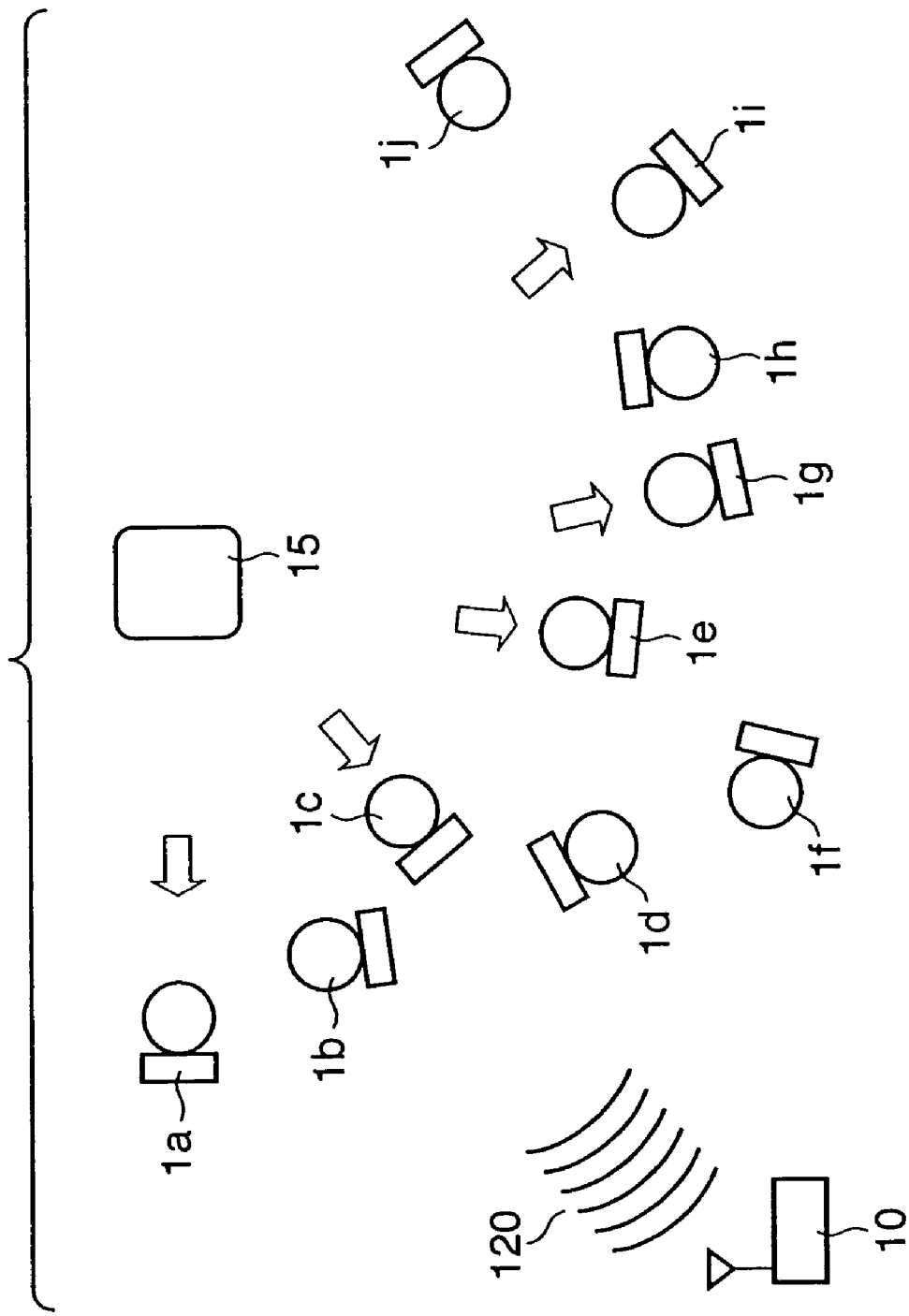
FIG. 12 is a schematic diagram showing the construction of a wireless communication apparatus according to a third embodiment of the present invention.

FIG. 12 is a schematic diagram showing the construction of a wireless communication apparatus according to the present invention. The wireless communication apparatus has plural functional devices (imaging Motes 1) having a wireless communication function and an imaging function as a functional device group.

Figure 13:
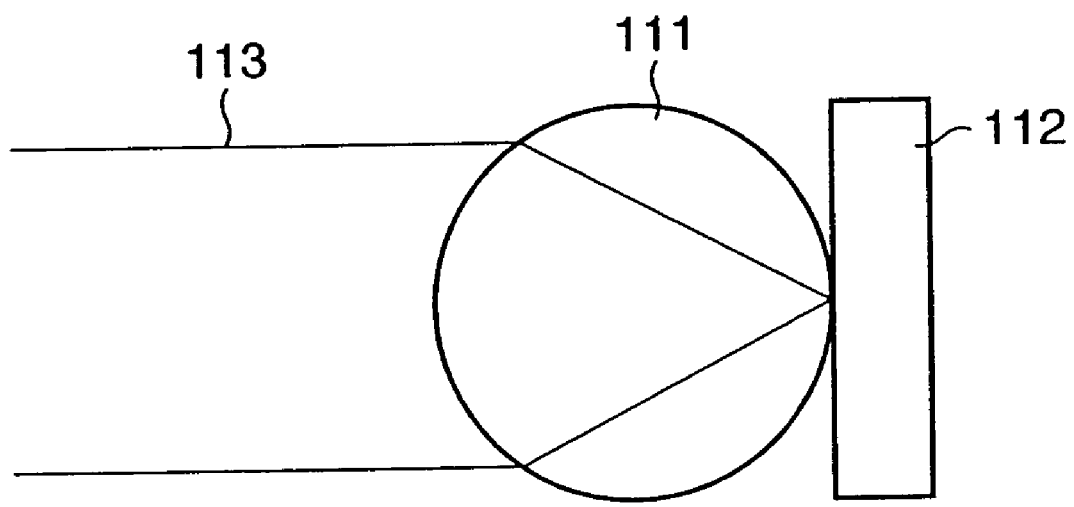
FIG. 13 is a schematic diagram showing the structure of an imaging Mote according to the third embodiment.

In FIG. 12, the imaging Motes 1a to 1j are provided at random in random directions. As shown in FIG. 13, the imaging Mote 1 performs imaging by gathering light 113 incident on a spherical lens 111 by an optical sensor 112. The obtained image information is wireless-transmitted using e.g. an electromagnetic wave 120, to a base 10. That is, the optical sensor 112 as shown in FIG. 13 includes a wireless communication unit (not shown).

For example, in FIG. 12 where imaging is performed on a subject 15, video images obtained by the imaging Motes 1a, 1c, 1e and 1i directed to the subject 15 are combined by the base 10.

In the present embodiment, the respective imaging Motes 1 have a simple structure where the aperture and the lens position are fixed. That is, a general camera has mechanisms to change the depth of subject with a variable aperture and move the lens position to adjust focus of the lens, whereas the imaging Mote 1 of the present embodiment has a single imaging function without variable part, i.e., the structure is simplified with the respective fixed parts.

Accordingly, as reduction of cost and electric power consumption can be realized in each imaging Mote 1, even if a sensing network is constructed with a large number of imaging Motes 1, the entire electric power consumption and cost are not increased.

Further, as imaging is performed by the large number of imaging Motes 1, the subject can be image-sensed from various angles, and the dynamic range of aperture, focus, sensitivity and the like can be widened. That is, although each imaging Mote 1 has a simple structure, when a large number of imaging Motes 1 function as a group, the group functions as a high-performance imaging device.

Note that in the above description, the electromagnetic wave 120 is used in wireless communication, however, optical communication may be used in the wireless communication. Further, as described in the subsequent embodiment, in addition to omission of movable parts, the imaging Mote 1 can be simplified by employing any one of R, G and B color filters as a single filter.

Further, the base 10 may have the same structure as that of other imaging Motes 1. In this case, the wireless communication apparatus does not have an imaging Mote named "base", but one of the imaging Motes 1 is connected to a network circuit thereby communication with the outside is performed. Note that in a case where images obtained by the respective imaging Motes 1 are corrected and combined into one image prior to communication with the external network line, it is preferable that the base 10 is separately provided from the imaging Motes 1 as in the case of the above description.

Fourth Embodiment

Figure 14:
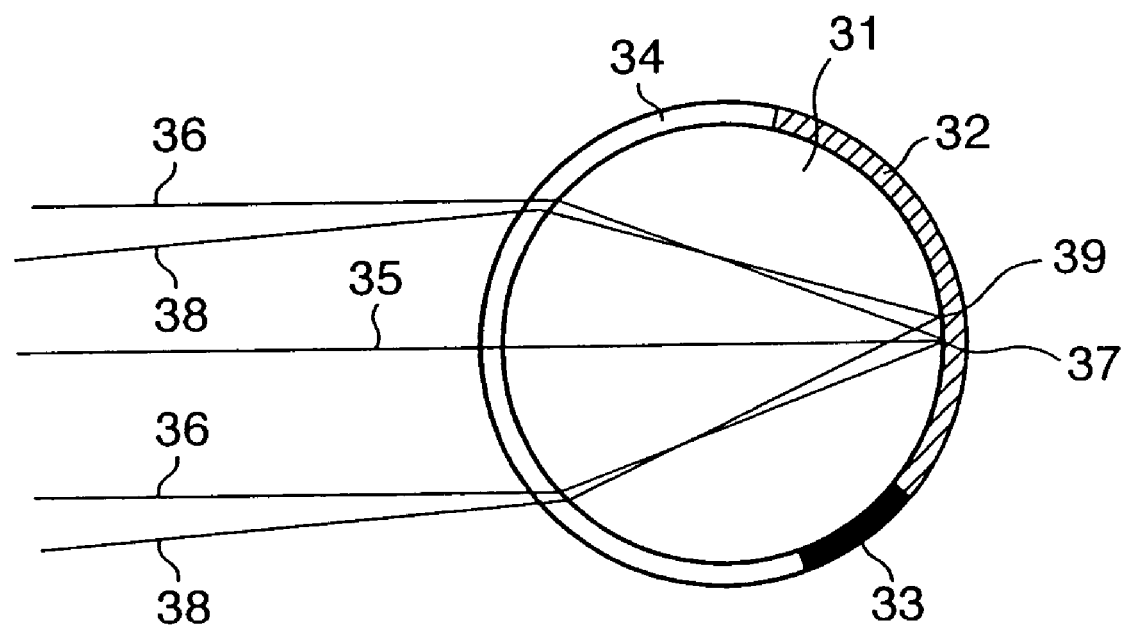
FIGS. 14 to 17 are schematic diagrams showing the structure of the imaging Mote according to a fourth embodiment of the present invention.

FIG. 14 is a schematic diagram showing the structure of the imaging Mote according to a fourth embodiment of the present invention.

As an imaging Mote 34, a small spherical lens 31 is employed, an optical sensor 32 for imaging is arranged around the surface of the spherical lens on the opposite side to the imaging light incident side, and further, a communication circuit 33 to receive a radio wave and transmit a signal from the optical sensor 32 is provided on the same substrate of the sensor around the surface of the spherical lens. In this case, the substrate has a spherical shape.

Light 36 incident in parallel to an optical axis 35 is condensed by the small spherical lens 31 in a point 37 around the surface of the lens. Light 38 with a field angle is condensed by the small spherical lens 31 on a point 39 around the surface of the lens. In this manner, images are formed on the surfaces of the small spherical lenses. Assuming that the refractive index nd of the small spherical lens 31 is "2", collimated light i.e. light at infinity is image-focused around the surface of the lens on the opposite side to the incident side. For example, if a glass material S-LAH 70 (Ohara) is used for a visible d ray (587.6 nm), as nd=2.003 holds, this condition is satisfied. Further, if the diameter of the lens is 1 mm, a focused state can be obtained beyond 5 cm.

Although a sufficient image can be obtained since a chromatic aberration is not so large, the surface of the spherical lens 31 on the incident side is provided with a filter for selection of particular wavelength, thereby the chromatic aberration an be suppressed.

Further, 100×100 (for 10,000 pixels) photoreception devices, having 1-cell diameter of 2 μm, can be provided. As the photoreception devices are provided in a small sphere, a stable functional device unsusceptible to external environment can be obtained.

Figure 15:
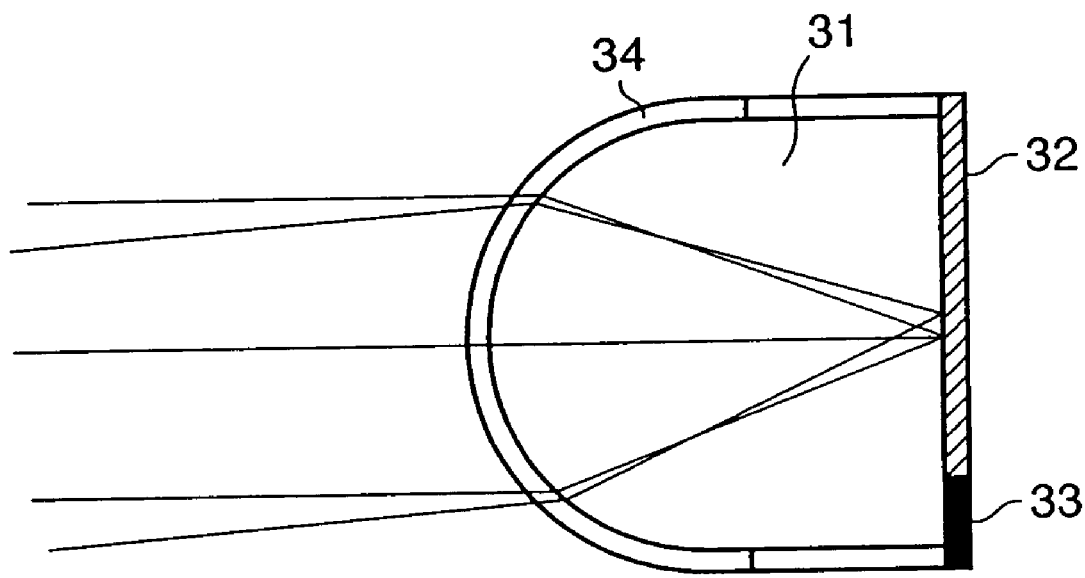

FIG. 15 shows the small spherical lens 31 having a flat surface on the side of the optical sensor 32 of the sensing Mote 34. As the optical sensor 32 has a flat shape, the aberration is increased, however, the circuit can be easily formed on the flat substrate. This structure is available in an application in which image quality is not so important. Further, as a manufacturing method, the small spherical lens 31 is formed, then the imaging side is ground to a flat surface, and a separately-formed flat substrate is joined to the flat surface. In this manner, the lens can be easily manufactured. That is, the optical sensor 32, the communication circuit 33 and the like are formed in advance on the flat substrate, thereafter, the substrate is joined to the small spherical lens 31 by adhesive bonding or the like. Further, a light emitting device for optical communication may be provided on the substrate.

Further, in this arrangement, the refractive index of the small spherical lens 31 is not necessarily set to "2", but the thickness of the flat substrate is set for image formation on the imaging surface. As the glass material, LaSFN9 (nd=1.850), sapphire, ruby, $Al_2O_3$ (nd=1.77) and the like may be used as glass material appropriate to purposes under sever conditions (transmission with high intensity, high hardness, anti-chemical property, IR transmission). Otherwise, a very low-price sensing Mote 34 can be manufactured using general glass material, BK7 (nd=1.517).

Figure 16:
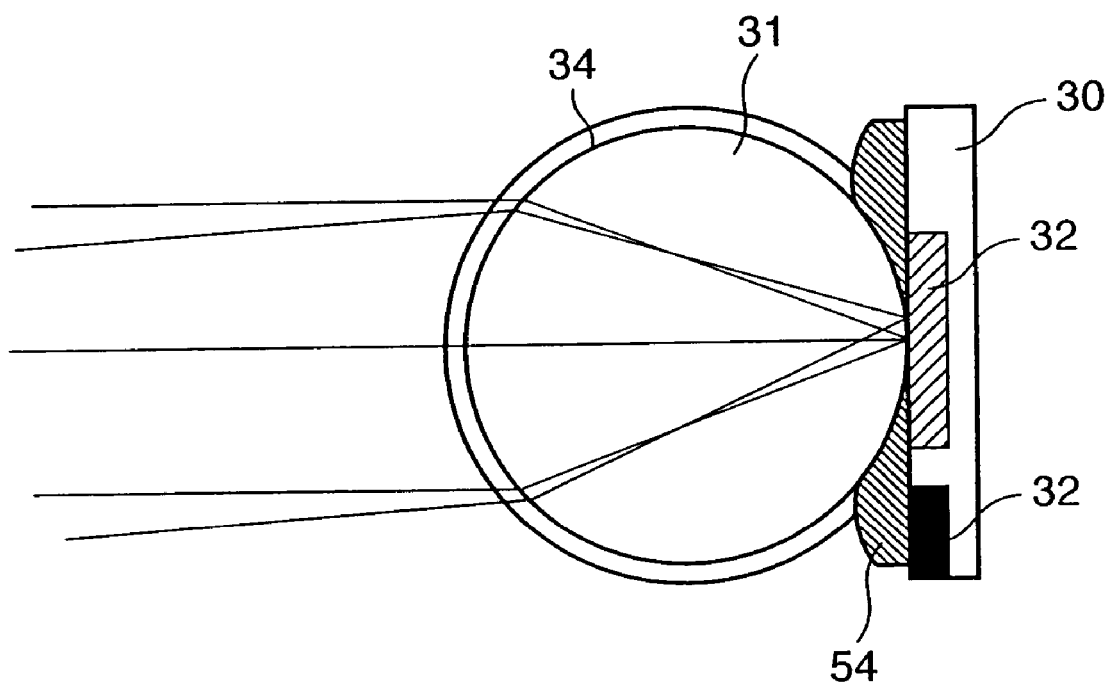

FIG. 16 shows an example where, different from the above case where the circuit system is directly formed on the surface of the small spherical lens 31, a separately-formed substrate 30, holding electronic circuits such as the optical sensor 32 and the communication circuit 33, in contact with the small spherical lens 31, is joined with the lens using adhesive 54 or the like. In this case, the adhesive 54 constructs a part of the lens system. Influence of aberration increases as the field angle is shifted from the optical axis, however, in some purposes, the image information can be utilized as high resolution image is not required. In this manufacturing, a very low-price sensing Mote 34 can be formed and used for a wide range of purposes.

Figure 17:
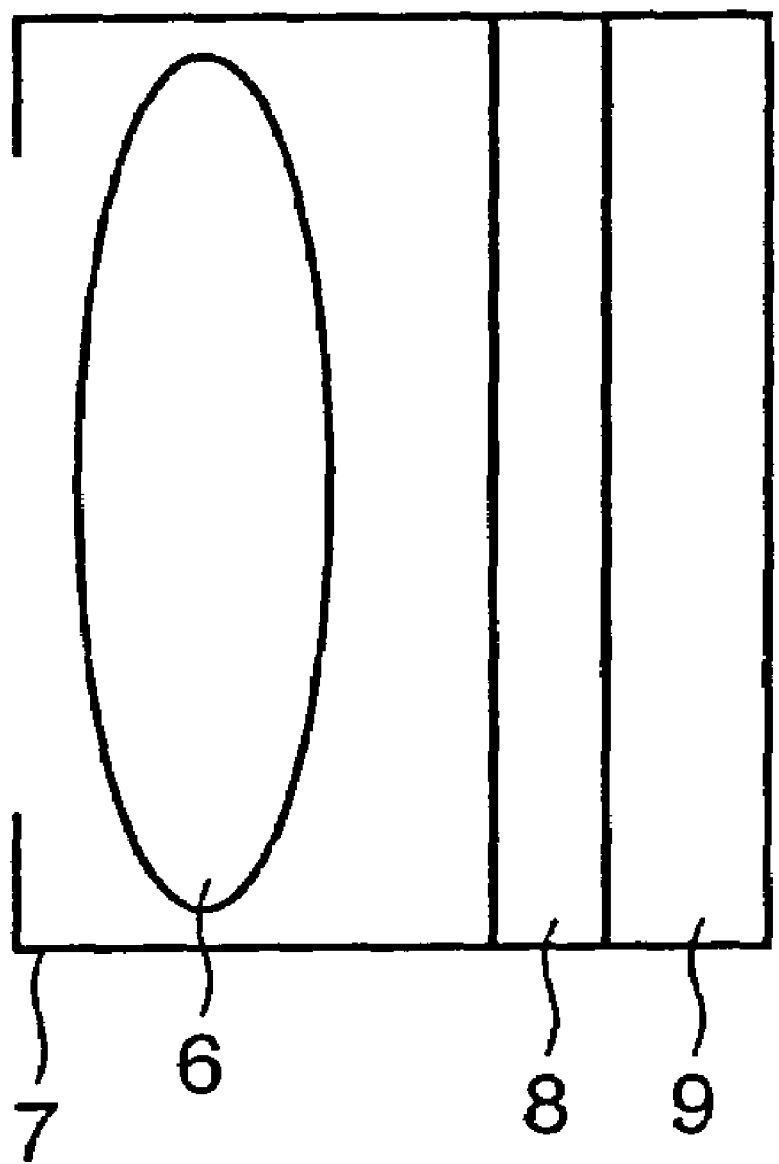

FIG. 17 shows an example where, different from the above-described spherical lens, the imaging Mote has an optical lens 6 which is a general convex lens. Incident light is passed through an aperture 7 and is gathered on an optical sensor 8, and delivered as data by wireless communication from a communication circuit 9.

Generally, various types of lenses are designed for a wide field angle imaging optical system. In the optical system of this type, as the lens diameter increases, the image screen size increases, which increases the size of the imaging optical system. Further, in a case where wide field angle sensing is intended in a conventional optical system, the amount of ambient light is greatly reduced due to the well-known cosine forth power law.

As a simple optical system to attain a wide field angle, a spherical lens is conventionally known. Generally, in a lens system having a small curvature and a flat image surface, the size of image surface is infinitely increased as the field angle becomes closer to 180°, and the amount of ambient light reaches to the image surface is greatly reduced. Accordingly, in a conventional fish-eye lens, a large negative curvature aberration is intentionally caused, to attain the 180° field angle and prevent the significant reduction of amount of ambient light. However, as the occurrence of negative curvature aberration equals compression of image in a peripheral portion of the image surface, the resolution is lowered and the image formation performance is degraded.

On the other hand, in a case where the image of a subject at infinity is focused using a spherical lens, the image surface is a spherical surface cocentric with the spherical lens due to spherical symmetric property of the lens. Accordingly, in the spherical lens, axial aberration and off-axial aberration are equal. If approximately excellent aberration correction is attained on the axis, the off-axial aberration can be similarly corrected.

Further, if a sensor having a spherical photo reception surface is provided on the spherical image surface, excellent imaging can be performed at nearly 180° wide field angle.

More particularly, assuming that the focal distance of the spherical lens is f, if the photoreception area of the sensor is $2\pi f^2$, a field angle of 180° can be obtained. Thus a small sensor can be used. Further, the degradation of resolution in a lens peripheral portion due to spherical symmetric property of the spherical lens does not occur. Further, the great reduction of the amount of ambient light due to the cosine forth-power law in a general lens system does not occur. The amount of ambient light is merely reduced in proportion to the power of the cosine of incident angle.

Accordingly, in this optical system which is smaller and simple in comparison with a general lens system, as reduction of the amount of ambient light is small by appropriate aberration correction, a wide field angle optical system with an entirely bright image surface and excellent image forming performance can be obtained.

To provide a large number of imaging Motes and to obtain a fine image, the downsizing of the imaging Mote is important. For this purpose, it is preferable that the imaging Mote is constructed with a spherical lens and an optical sensor.

Fifth Embodiment

Figure 18A:
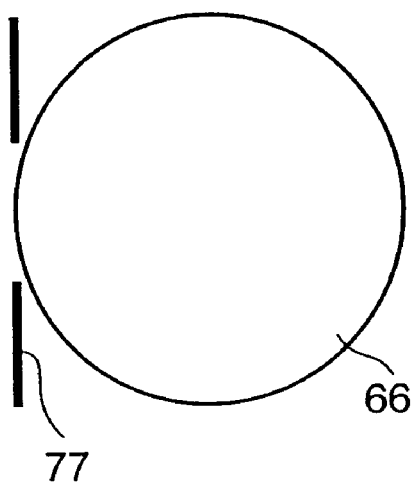
FIGS. 18A and 18B are schematic diagrams showing positional relation between the spherical lens of the imaging Mote and the aperture according to a fifth embodiment of the present invention.
Figure 18B:
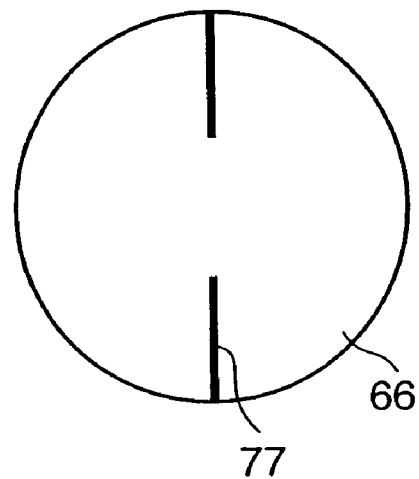

The imaging Mote using a spherical lens has been described in the forth embodiment. As shown in FIG. 18A, the aperture 77 is positioned on the incident light side of the spherical lens 66 or positioned inside the spherical lens 66 as shown in FIG. 18B. If the aperture 77 is positioned in the central portion of the spherical lens 66, a high resolution image can be obtained, the field angle can be increased, and unnecessary light can be eliminated by reduction of coma aberration. Accordingly, more preferably, the aperture 77 is positioned in the central portion of the spherical lens 66.

If the aperture 77 is reduced in size, as the aberration of the lens is suppressed, degradation of image due to the aberration is reduced, and the resolution is improved. In contrast, if the aberration is small, the relation among the resolution R, the wavelength λ, the lens numerical aperture NA, the lens refractive index n, and the aperture (lens effective aperture) D is as follows.

$$R=k|(\lambda/NA)=k|(\lambda/n\sin\theta) \approx k|(\lambda/n\tan\theta)=k|f\lambda/n\{(D/2)/L\}J=k|[2\lambda/(nD/L)]=k|(2\lambda/Fno)$$

That is, as the aperture D increases, the resolution R is improved in proportion to the aperture.

On a wavelength of 400 nm to 900 nm, as the numerical aperture of several hundred μm is sufficiently large, the above concept is applied. The focal depth DOF is $k2\{\lambda/(NA)^2\}$, and becomes shorter in proportional to the second power of the aperture D. In the spherical lens, as the influence of the aberration is greater, high resolution and long depth can be attained when the aperture is small.

Sixth Embodiment

Figure 19C:
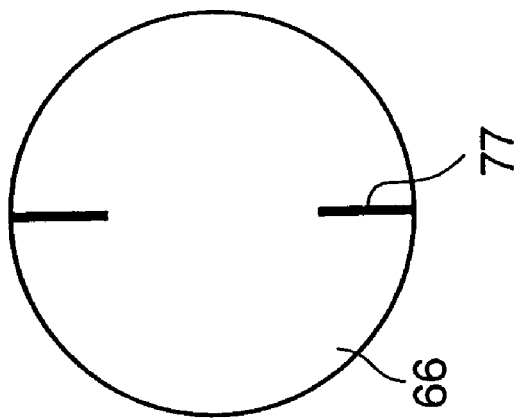
FIGS. 19A to 19C are schematic diagrams showing an example of aperture sizes of the imaging Mote according to a sixth embodiment of the present invention.
Figure 19B:
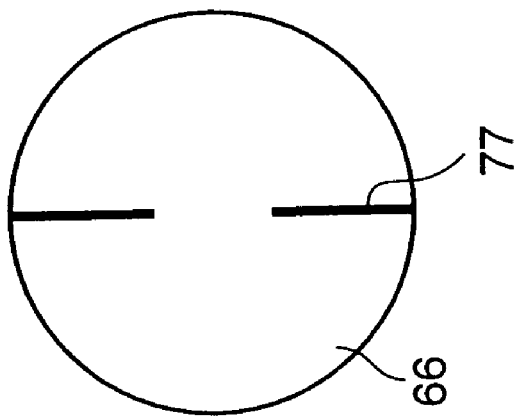
Figure 19A:
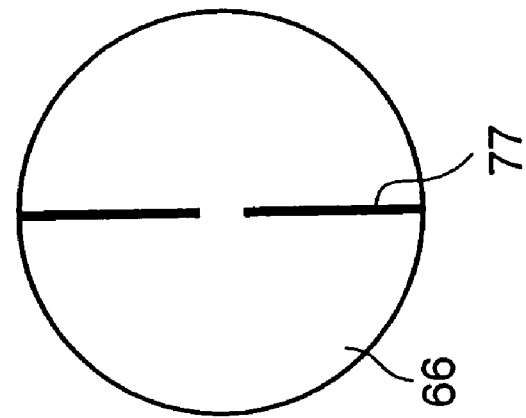

FIGS. 19A to 19C are schematic diagrams showing examples of the imaging Mote. The imaging Mote, constructed with the spherical lens 66 and the aperture 77, has different apertures as shown in FIGS. 19A to 19C. A large number of imaging Motes having different apertures are provided, and video image data obtained from the respective imaging Motes are transmitted to the base. The base selects only a video image from an imaging Mote having the aperture corresponding to an imaging subject and imaging environment and uses the selected video image. Thus the same advantage as that obtained by changing the aperture in a single imaging Mote can be obtained.

The aperture of the camera is normally changed in accordance with an imaging subject, a working distance between the lens and the subject, an imaging environment such as brightness. However, in the above case, imaging Motes respectively set to several apertures are provided and imaging data is selected in correspondence with the circumstance, thus the aperture can be substantially changed.

Seventh Embodiment

In the sixth embodiment, the aperture is changed by selection of imaging Mote. Further, the filter of the optical lens can be changed by selection of imaging Mote.

Figure 20:
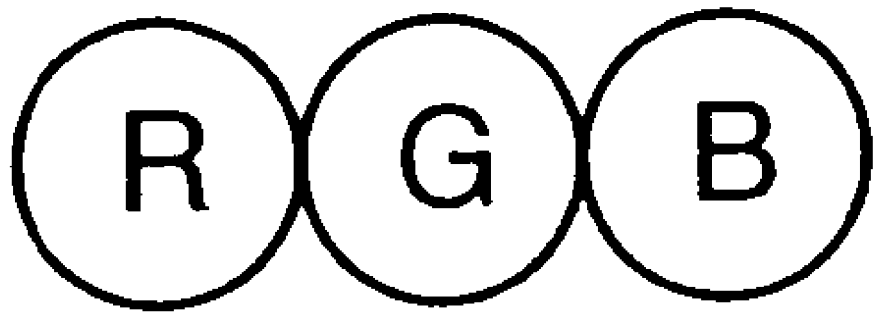
FIG. 20 is a schematic diagram showing the structure of color filters of the imaging Mote according to a seventh embodiment of the present invention.

As an example, as schematically shown in FIG. 20, filters of red (R), blue (B) and green (G) as the 3 primary colors of color image may be provided. Any of the 3 color filters of a CCD sensor may be fixed to each imaging Mote. Otherwise, even in a case where a color optical sensor is not used, if each imaging Mote is constructed with a monochrome optical sensor and a spherical lens with a color-filter, each Mote can output an image of one of the respective colors.

Further, a filter of any one of cyan, magenta, yellow and green complementary colors may be employed.

Further, a polarizing filter may be provided. For example, a linear polarization or circular polarization filter may be set in the respective imaging Motes, or a combination of these filters with an infrared filter may be used. The imaging Mote with a particular polarizing filter is effectively used upon imaging of a subsurface fish or the like.

Eighth Embodiment

Figure 21:
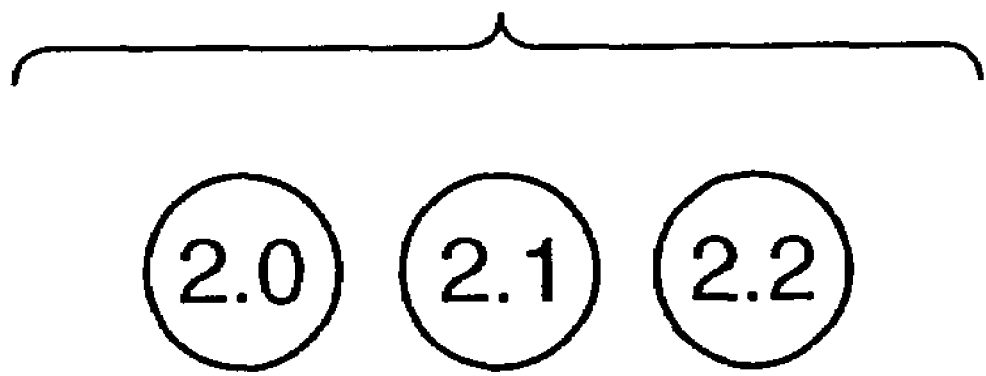
FIG. 21 is a schematic diagram showing an example of lens refractivities of the imaging Mote according to an eighth embodiment of the present invention.
Figure 22A:
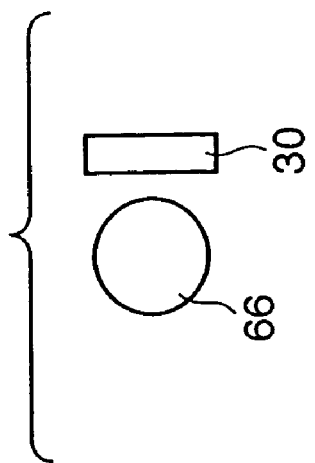
FIGS. 22A to 22C are schematic diagrams showing an example of a junction position between the spherical lens and an optical sensor.
Figure 22B:
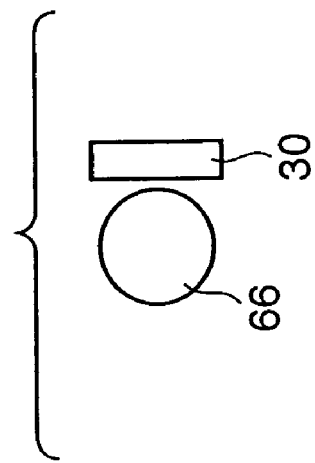
Figure 22C:
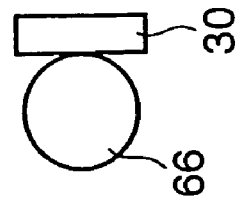

FIG. 21 is a schematic diagram showing an example where the refractive index n of the spherical lens is slightly changed in respective imaging Motes. A focused state can be obtained in different points in the respective imaging Motes. For focusing at infinity, the point is on the spherical surface with the refractive index nd=2, however, to get a near subject into focus, the refractive index must be greater than 2. Further, as schematically shown in FIGS. 22A to 22C, in a system where the small lens 66 and the substrate 30 as shown in FIG. 16 are joined, if imaging surfaces are arbitrarily defocused, a focused state can be obtained by any imaging Mote.

Note that in the fourth to eighth embodiments, the examples of the spherical lens have been described, however, the present invention is not limited to the spherical lens, but is applicable to imaging Motes using a concave lens, a convex lens and the like.

Ninth Embodiment

To improve the resolution, images are obtained from a large number of imaging Motes and subjected to image processing, by previously controlling the positions and directions of the respective imaging Motes, or obtaining a mean from a large number of imaging Motes provided at random. In the third embodiment, the imaging Motes are provided at random, however, as shown in FIG. 23, if the directions of the imaging Motes 1 are controlled to set the lenses toward the imaging subject 15, the number of effective image data is increased. Further, it is more preferable that the positions of the imaging Motes 1 can be controlled. Note that it is necessary to install a direction control mechanism and/or a moving means into the imaging Mote 1.

According to the third to ninth embodiments, as each functional device has a simple structure, low electric consumption and low cost imaging apparatus can be realized, and a high-level imaging network can be constructed.

As many apparently widely different embodiments of the present invention can be made without departing from the spirit and scope thereof, it is to be understood that the invention is not limited to the specific embodiments thereof except as defined in the appended claims.

What is claimed is:

1. A wireless imaging device, comprising:
   an imaging section, arranged to provide a function of imaging a subject; and
   a communication section, arranged to provide a wireless communication function,
   wherein said imaging section comprises an optical lens which has a spherical body, an iris to limit incident light on the optical lens, an optical sensor to convert the incident light passed through an aperture of the iris into an electric signal, and an antenna integrally provided with the iris, to wireless-transmit the electric signal converted into a radio signal by said communication section,
   wherein the iris and the antenna are arranged to a midsection of the optical lens, and the optical sensor is arranged to a part of a spherical surface of the optical lens.

2. The device according to claim 1, wherein said communication section generates a radio frequency signal based on the electric signal, and supplies the generated radio frequency signal to the antenna.

3. The device according to claim 1, wherein the entire surface of the iris is formed as the antenna.

4. An image obtaining apparatus, comprising a device described in claim 1 in plural, wherein the plural devices and wireless communication described in claim 1 construct a network of the plural devices.

5. The apparatus according to claim 4, further comprising a base section arranged to perform the wireless communication with the plural devices, to control transmission of imaging information from the plural devices, and to receive the imaging information.

6. A method of controlling an image obtaining apparatus described in claim 4, comprising the steps of:
   performing wireless communication to control transmission of imaging information from a plurality of devices; and
   receiving the imaging information by the wireless communication.

7. An image obtaining apparatus, comprising a plurality of imaging devices which provide a wireless communication function and a single imaging function, Wherein the number of the plurality of imaging devices is larger than that of subjects to be imaged by the plurality of imaging devices, and an aperture value of the imaging function in each imaging device is fixed, Wherein said the plurality of imaging devices provide, as a whole, one or more high-level imaging functions by co operative work using said wireless communication function using image synthesis to synthesize imaging data of a part of the plurality of imaging devices which has an appropriate aperture value for the subjects and captures a picture of the subjects, Wherein each imaging device has a spherical lens and an optical sensor, and a refractive index of said the spherical lens is different by each imaging device, Wherein an iris and an antenna are arranged to a midsection of the spherical lens, and the optical sensor is arranged to a part of a spherical surface of the spherical lens.

8. The apparatus according to claim 7, further comprising a base section arranged to perform the wireless communication with the plurality of imaging devices, to control transmission of the imaging data from the plurality of imaging devices, and to receive the imaging data.

9. The apparatus according to claim 7, wherein each imaging device has a sensing function, and wherein a network of the plurality of imaging devices is constructed utilizing the wireless communication, to provide information to be managed by an external device.

10. The apparatus according to claim 7, wherein the plurality of imaging devices respectively have a single color filter.

11. The apparatus according to claim 7, wherein the plurality of imaging devices respectively have a polarizing filter.

12. The apparatus according to claim 11, wherein the polarizing filter has a liner polarizing or circular polarizing property.

* * * * *